(12) United States Patent
Raman

(10) Patent No.: US 8,612,996 B2
(45) Date of Patent: Dec. 17, 2013

(54) TECHNIQUE FOR INTEGRATING A DISTRIBUTED OBJECT SYSTEM COMPONENT WITH A SERVICE ORIENTED ARCHITECTURE APPLICATION

(75) Inventor: Prabhat Raman, Karnataka (IN)

(73) Assignee: SAP AG, Walldorf (DE)

( * ) Notice: Subject to any disclaimer, the term of this patent is extended or adjusted under 35 U.S.C. 154(b) by 1801 days.

(21) Appl. No.: 11/617,787

(22) Filed: Dec. 29, 2006

(65) Prior Publication Data

US 2008/0163166 A1 Jul. 3, 2008

(51) Int. Cl.
G06F 3/00 (2006.01)
G06F 9/44 (2006.01)
G06F 9/46 (2006.01)
G06F 13/00 (2006.01)

(52) U.S. Cl.
USPC ............ 719/316; 719/328; 719/332; 717/104

(58) Field of Classification Search
None
See application file for complete search history.

(56) References Cited

U.S. PATENT DOCUMENTS

| | | | |
|---|---|---|---|
| 7,665,064 B2 * | 2/2010 | Able et al. | 717/117 |
| 2003/0163585 A1 * | 8/2003 | Elderon et al. | 709/246 |
| 2007/0143447 A1 * | 6/2007 | Beckum et al. | 709/219 |

* cited by examiner

Primary Examiner — Lewis A Bullock, Jr.
Assistant Examiner — Mark Gooray

(57) ABSTRACT

A method for receiving user event at a distributed object system component, passing the received user events to a service oriented architecture (SOA) application for processing and receiving the result of the processed user events at the distributed object system component from the SOA application.

11 Claims, 4 Drawing Sheets

TECHNIQUE FOR INTEGRATING A DISTRIBUTED OBJECT SYSTEM COMPONENT WITH A SERVICE ORIENTED ARCHITECTURE APPLICATION

FIELD OF THE INVENTION

The invention relates to a service oriented architecture (SOA) application and the use of a distributed object system within the SOA application.

BACKGROUND OF THE INVENTION

The Microsoft® ActiveX® control is typically a programmable software component that may be used in software application development tools and software applications. Examples of the Microsoft® ActiveX® control include graph components that display data visually in the form of graphs, a component that imports an image file into a word processing document for example, Microsoft® Office Word, a stock ticker in a web page, a user interface component that displays time in a software application, audio player, video player or textbox. Microsoft® ActiveX® controls are typically reusable components that may be integrated with various software applications. Nevertheless, Microsoft® ActiveX® control typically operates only with Microsoft® operating systems such as Microsoft® Windows XP. It may not be possible to integrate them with applications that run on operating systems other than Microsoft® operating systems.

Service oriented architecture (SOA) supports the design, development, identification and consumption of standardized software services across an enterprise, thereby improving reusability and flexibility of software components. A SOA application typically runs on various operating systems. Hence, integrating Microsoft® ActiveX® control with the SOA application may not be a viable option.

SUMMARY OF THE INVENTION

A method for receiving user event at a distributed object system component, passing the received user events to a service oriented architecture (SOA) application for processing and receiving the result of the processed user event at the distributed object system component from the SOA application.

Integrating a distributed object system component with the SOA application involves enabling the distributed object system component to communicate with an enterprise server via an enterprise service infrastructure (ESI) interface. Integrating the distributed object system component with an integrated development environment (IDE) used to model the SOA application involves providing programmable interfaces that enable the distributed object system component to communicate with the IDE. Integrating the distributed object system component with the IDE may result in easier, faster and more efficient development of SOA applications.

DETAILED DESCRIPTION

A distributed object system component is typically a programmable software component that may be used in software application development tools and software applications. The distributed object system component 210 is typically a reusable component that may be integrated with various software applications that typically run on various operating systems. The distributed object system component typically supports a set of customizable application programming interfaces (API's) that allows the distributed object system component to be integrated with various software applications. Integrating a distributed object system component with a service oriented architecture (SOA) application involves enabling the distributed object system component to communicate with an enterprise server via an enterprise service infrastructure (ESI) interface. Integrating the distributed object system component with an integrated development environment (IDE) used to model the SOA application involves providing programmable interfaces that enable the distributed object system component to communicate with the IDE. Integrating the distributed object system component with the IDE may result in easier, faster and more efficient development of SOA applications.

SOA supports the design, development, identification and consumption of standardized software services across an enterprise, thereby improving reusability and flexibility of software components. Enterprise Service Architecture (ESA) is a blueprint for SOA that more effectively addresses business software needs and is rapidly deployable.

Figure 1:
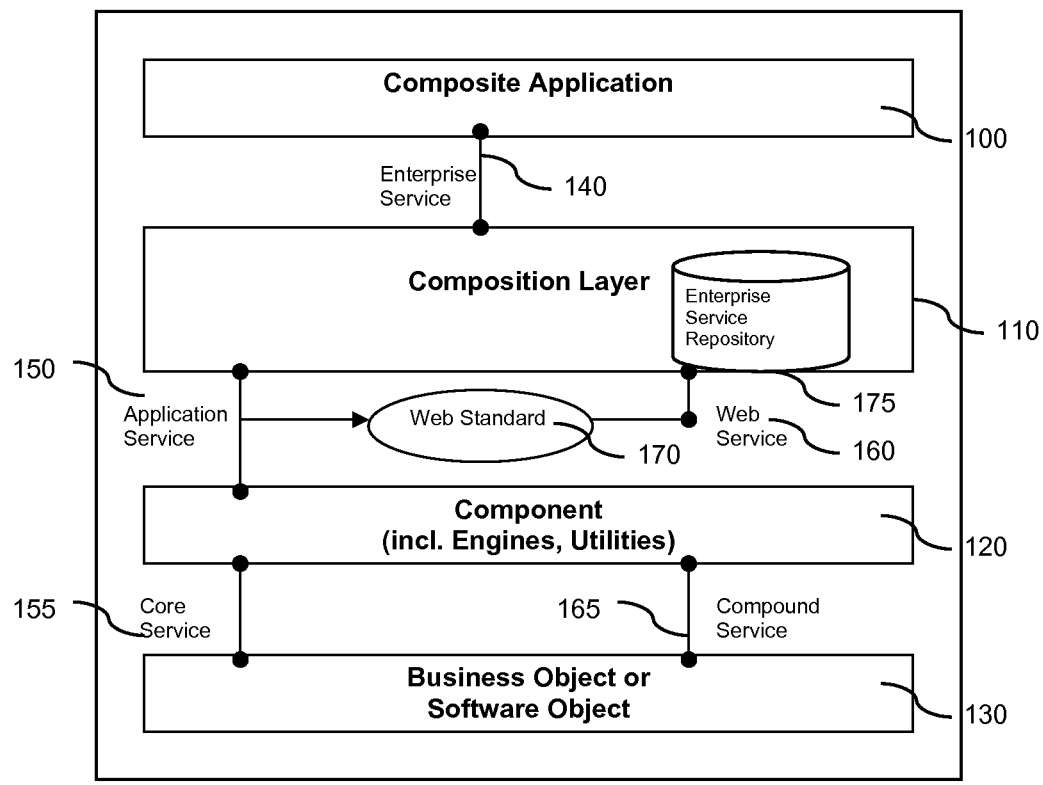
FIG. 1 illustrates a service oriented architecture (SOA) in accordance with an embodiment of the invention.

FIG. 1 illustrates the SOA. Composite application 100 resides on top of component 120, and makes use of data and functions that are provided as services that include application service 150 and web service 160 by the underlying component 120. The composite application 100 may add business logic and provide user interfaces in support of a business application.

A composition layer 110 allows a model based composition and orchestration of services to enable or enhance business processes. The composition layer 110 typically enables the development, deployment and administration of enterprise service 140. The composition layer 110 typically provides tools for creating and managing enterprise service 140 and also typically supports the design, implementation and execution of applications that use enterprise services 140, like composite applications in layer 100. The composition layer 110 typically includes an Enterprise Service Repository (ESR) 175 which is a central repository where enterprise services 140 and software objects 130 are modeled and their corresponding metadata stored. The enterprise service 140 is typically a web service 160 that has an enterprise level business meaning. Enterprise services 140 are typically an aggregation of application services 150 or web services 160 of lower or smaller business functionality combined with business logic to support a step of a business process. The enterprise services 140 are typically hosted in an enterprise server. Web services 160 represent a self-contained, self-describing piece of application functionality that can be accessed by other applications. An application service 150 represents services exposed from an application component or component 120 and allows access to a lower or smaller level of functionality of enterprise applications. An application service 150 can either be proprietary or could be implemented in web standard 170 such as extensible markup language (XML) to become a web service 160.

Component 120 is typically a modular, re-usable piece of application software. SOA applications are constructed from the component 120 and composite application 100 according to the ESA. The components 120 are made up of various entities that include engines, utilities and software objects 130. The software objects 130 typically provide a set of functionalities or services. For example, a customer or business partner software object may provide services such as obtaining the name, address, and contact details of a customer.

Figure 2:
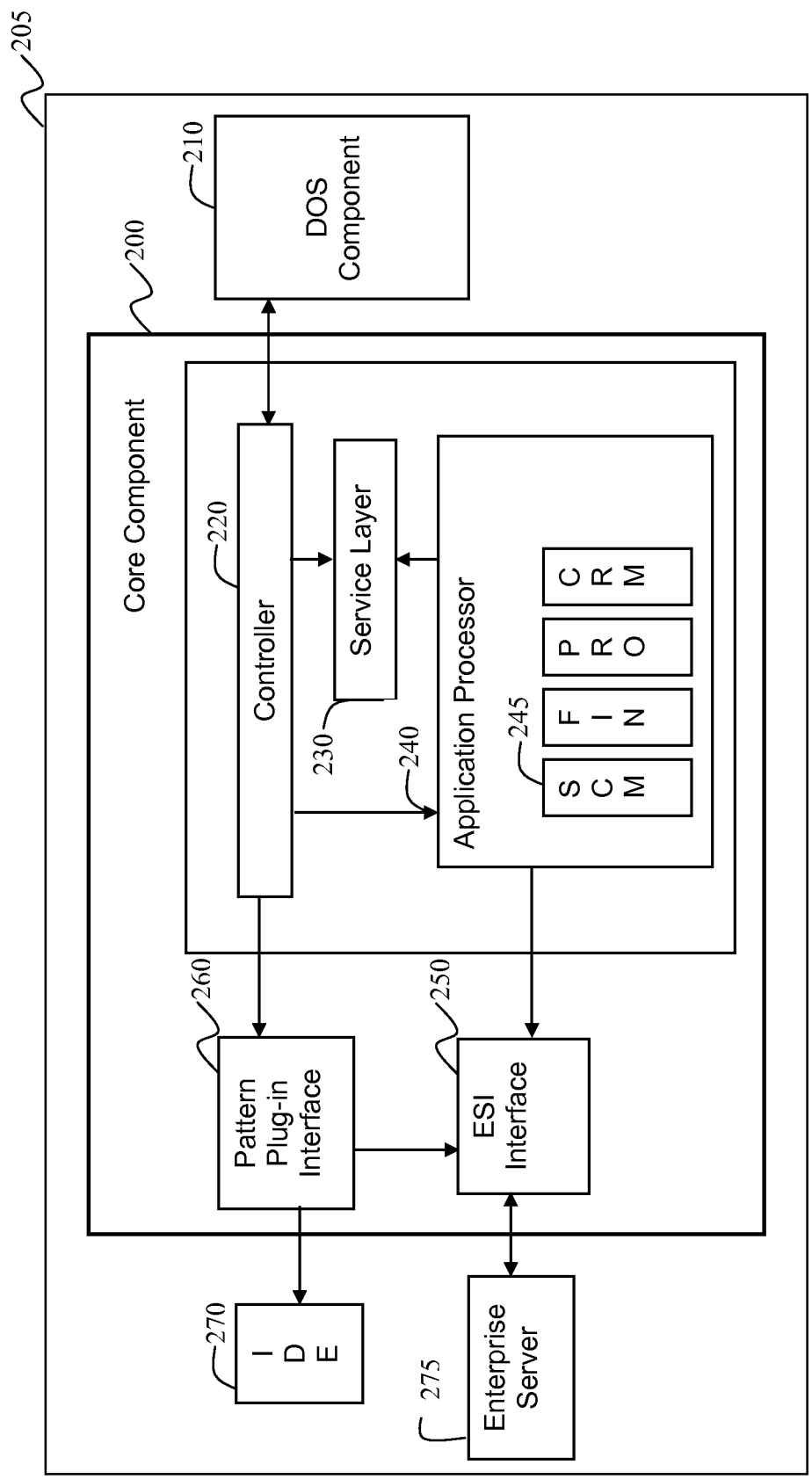
FIG. 2 illustrates various components of the system involved in integrating a distributed object system component with a SOA application and with an integrated development environment (IDE) in accordance with an embodiment of the invention.

In FIG. 2, a distributed object system component 210 is typically a programmable software component that may be used in software application development tools and software applications. The distributed object system component 210 operates in a way similar to that of Microsoft® ActiveX® control. The distributed object system component 210 may be implemented in languages such as C, C++, Java and .NET. The distributed object system component 210 also typically enables network based component interaction with software applications over a communication network.

Consider an example scenario in the SOA application, wherein the first application, displays the sales revenue of a company for a period of five years in a graphical format. A graphical component that displays the sales revenue data in the graphical format is needed if the graphical component is not offered by the SOA application development tool. Such a graphical component further typically needs to be developed and integrated with the SOA application by a first team. The development and integration of the graphical component can be a time consuming process. A second team working on a second application may want to display data in a similar graphical format. The second team has at least two options first; to reuse the already developed graphical component by the first team or second, develop the graphical component again if the already developed graphical component by the first team is not compatible with second application. The first option, reusing the already developed graphical component by the first team, may be a time consuming process as the second team may need to spend time on customizing the already developed graphical component by the first team according to the needs of second application. Also, it may not be possible to customize the already developed graphical component by the first team according to the needs of the second application since the graphical component developed by the first team may not be in a reusable form. The second option, developing the graphical component again, duplicates effort already made to develop the graphical component by the first team. Hence, the graphical component may be developed as the distributed object system component 210 and integrated with the SOA application. Developing the graphical component as the distributed object system component 210 makes it reusable in various SOA applications. Integrating the distributed object system component 210 with the SOA application development tools such as Netweaver®, Visual Composer®, provided by SAP AG, typically enables faster and more efficient development of SOA applications.

FIG. 2 illustrates the various blocks of a system 205 involved in integrating a distributed object system component 210 with a service oriented architecture (SOA) application according to an embodiment of the invention. In an example embodiment of the invention, the distributed object system component 210 is a graphical component that displays data fetched from an enterprise server 275 in a graphical format. The system 205 includes the distributed object system component 210, the enterprise server 275 that typically hosts the enterprise services, a core component 200 that facilitates the communication between the distributed object system component 210 and the enterprise server 275, ESI interface 250 that establishes a connection between the distributed object system component 210 and the enterprise server 275. The core component 200 comprises a controller 220, application processor 240, service layer 230, a pattern plug-in interface 260 and the ESI interface 250. The controller 220 captures the user events on the distributed object system component 210 and passes the captured user events to the application processor 240 for further processing. The application processor 240 receives the captured user events from the controller 220, and further processes the captured user events, which may result in the creation of data for the distributed object system component 210 in a format that includes XML. The application processor fetches data from the enterprise server 275 in response to the received user events and converts the fetched data to XML format before sending the data to the distributed object system component 210. The application processor 240 includes an application model 245. Some examples of application model 245 include supply chain management (SCM) model or finance (FIN) model or customer relationship management (CRM) model. Typically at any point of time only one given model is running. The service layer 230 provides services to the application processor 240 to create the XML data for the distributed object system component 210.

Core component 200 also facilitates communication between the distributed object system component 210 and the IDE 270. The system 205 further includes the pattern plug-in interface 260 that enables the distributed object system component 210 to communicate with an integrated development environment (IDE) 270. The IDE 270 such as Netweaver and Visual Composer, both provided by SAP AG is a development tool to model the SOA application.

Figure 3:
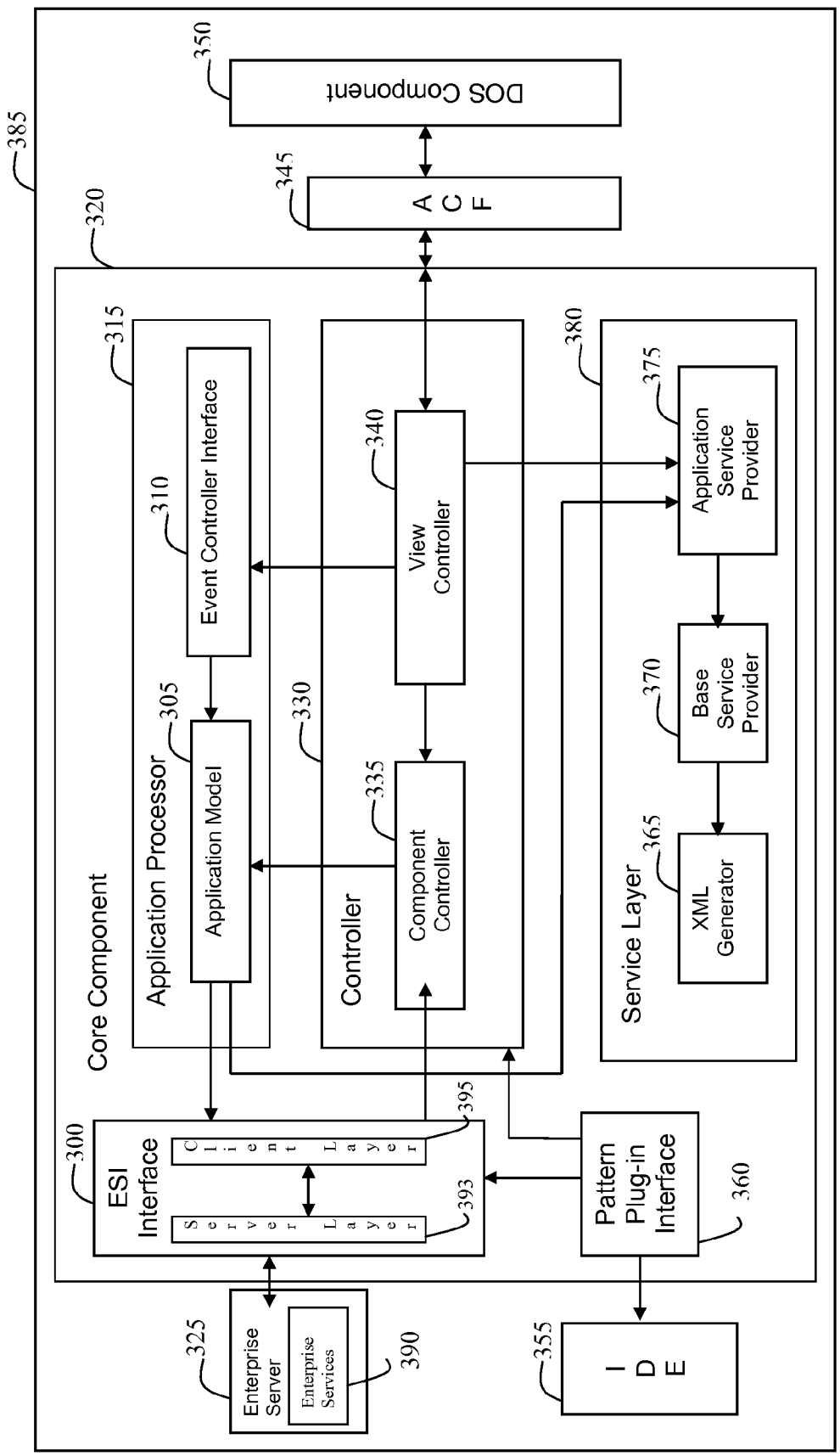
FIG. 3 illustrates in detail the various components involved in integrating the distributed object system component with the SOA application and with the IDE in accordance with an embodiment of the invention.

FIG. 3 illustrates in detail the various blocks of a system 385 involved in integrating the distributed object system component 350 with the SOA application and the IDE 355 according to an embodiment of the invention. The core component 320 comprises a controller 330, application processor 315, service layer 380, a pattern plug-in interface 360 and the ESI interface 300. The distributed object system component 350 communicates with the enterprise server 325 via the ESI interface 300. The ESI interface 300 typically comprises two logical layers, namely, a client layer 395 and a server layer 393. The client layer 395 of the ESI interface 300 typically has a standard application programming interface (API) to access the enterprise services 390 provided by the enterprise server 325. The server layer 393 of the ESI interface 300 typically hosts the enterprise services 390 provided by the enterprise server 325 and typically exposes a set of interfaces for the hosted enterprise services 390. The client layer 395 accesses the hosted enterprise services 390 via the set of interfaces exposed by the server layer 393. Thus, the ESI interface 300 establishes the connection between the distributed object system component 350 and the enterprise server 325.

The controller 330 includes a component controller 335 and a view controller 340. The component controller 335 typically controls the flow of the SOA application, which is the sequence of user interface (UI). The component controller 335 is also typically responsible for loading data of the SOA application. The view controller 340 typically holds a reference of the distributed object system component 350 and hence captures the user events on the distributed object system component 350. The view controller 340 passes the user events to the application processor 315 for further processing.

The application processor 315 typically includes an application model 305 and an event controller interface 310. The application model 305 includes UI specific business logic that typically is required to create the XML data to be sent to the distributed object system component 350. The event controller interface 310 typically is an interface between the controller 330 and the application processor 315 that receives the captured user events from the controller 330. The event controller interface 310 may be typically implemented by the application model 305 for processing the captured user events.

The service layer 380 includes an XML generator 365, a base service provider 370 and an application service provider 375. The XML generator 365 is typically used to create the generic XML tags according to a schema of the distributed object system component 350. The base service provider 370 typically provides basic services to create the XML that include methods create node, delete node. The application service provider 375 includes application specific functions like create task, create sales order, and show sales revenue that are typically used to create the SOA application specific data in the XML.

The distributed object system component 350 communicates with the core component 320 via active component framework (ACF) 345. The ACF 345 is a generic framework provided by SAP AG to enable distributed object system components 350 in web-based environments. ACF 345 helps the distributed object system components 350 to process mass data (display, modify and send the modified data back to the enterprise server) and offer an API which typically is called from the enterprise server 325.

Integrating the distributed object system component 350 with the IDE 355 enables the developers to use the distributed object system component 350 offered by the IDE 355 instead of customizing the existing distributed object system component 350 or developing new distributed object system component 350. The distributed object system component 350 is integrated with the IDE 355 by using the pattern plug-in interface 360, for example, provided by SAP AG. The pattern plug-in interface 360 typically has a set of APIs that enable the distributed object system component 350 to communicate with the IDE 355 and enables the distributed object system component 350 to be visible in, for example, the tool bar of the IDE. The pattern plug-in interface 360 also typically enables configuring the properties of the distributed object system component 350 such as height, font and title of the distributed object system component 350. The pattern plug-in interface 260 provides programmable interfaces for distributed object system component 350.

Figure 4:
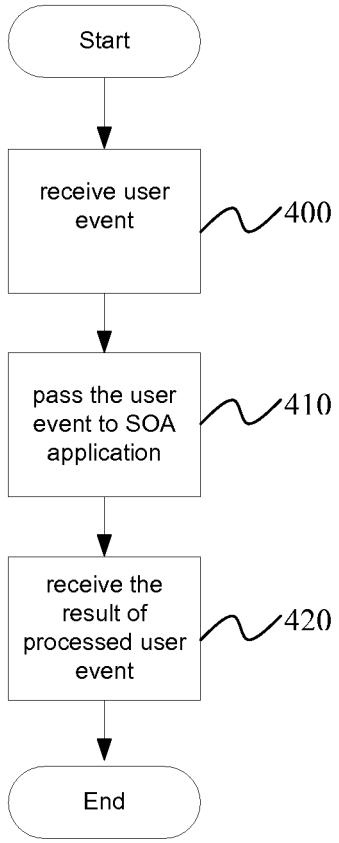
FIG. 4 is a flowchart illustrating certain aspects of a method for integrating the distributed object system component with the SOA application in accordance with an embodiment of the invention.

FIG. 4 is a flowchart illustrating certain aspects of a method for integrating the distributed object system component with the SOA application according to an embodiment of the invention. Step 400 illustrates receiving the user by the distributed object system component. Step 410 illustrates passing the received user event to the SOA application for further processing. Step 420 illustrates receiving the result of the processed user event by the distributed object system component.

Figure 5:
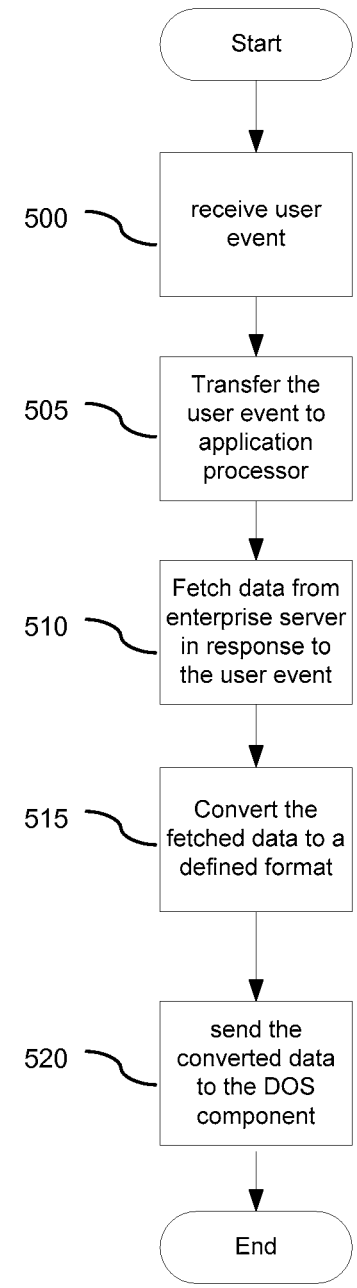
FIG. 5 is a flowchart illustrating in detail certain aspects of a method for integrating the distributed object system component with the SOA application in accordance with an embodiment of the invention.

FIG. 5 is a flowchart illustrating in detail certain aspects of a method for integrating the distributed object system component with the SOA application according to an embodiment of the invention. Step 500 illustrates receiving user event by the distributed object system component. Step 505 illustrates transferring the user event to the application processor in the SOA application via the controller 330 for further processing. The step 505, further results in the application processor fetching data from the enterprise server in response to the received user event as depicted at step 510. At 515, the fetched data is converted to a data format, such as XML format and then sent to the distributed object system component at step 520. In this way, the data is transferred between the enterprise server and the distributed object system component in the SOA application.

Embodiments of the invention may include various steps as set forth above. The steps may be embodied in machine-executable program code which causes a general-purpose or special-purpose processor to perform certain steps. Alternatively, these steps may be performed by specific hardware components that contain hardwired logic for performing the steps, or by any combination of programmed computer components and custom hardware components.

Embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, any other type of machine-readable media suitable for storing electronic instructions. The present invention may be downloaded as a computer program which may be transferred from a remote computer (e.g., a server) to a requesting computer (e.g., a client) by way of a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A computer implemented method to integrate a distributed object system (DOS) component with a service oriented architecture (SOA) application, the computer implemented method comprising:

capturing, at a core component by a controller, a user event from the DOS component using an active component framework (ACF) coupled to the DOS component to provide an application programming interface (API) called from an enterprise server;

transferring, by the controller, the user event to an application processor including an event controller interface and an application model to receive the user event from the controller;

processing, by the application processor, the user event by fetching data from the enterprise server in response to the captured user event based on user interface (UI) specific business logic via an enterprise services infrastructure (ESI) interface coupled to the core component to integrate the DOS component with the SOA application of the enterprise server for processing the user event;

converting, by the application processor, fetched data into a data format using services provided by a service layer of the core component;

sending the processed data to the DOS component; and integrating the DOS component with an integrated development environment (IDE) by a pattern plug-in interface of the core component, including a set of APIs to enable the usage of the DOS component without customizing the DOS component, wherein the IDE is configured to model the SOA application.

2. The computer implemented method of claim 1, wherein the user event is received at the DOS component.

3. The computer implemented method of claim 1, wherein processing the user event further comprises converting the fetched data into a data format.

4. The computer implemented method of claim 3, wherein the data format comprises extensible markup language (XML) format.

5. A system to integrate a distributed object system (DOS) component with a service oriented architecture (SOA) application, the system comprising:
the DOS component to receive a user event;
an enterprise server to source data for the DOS component;
an active component framework (ACF) coupled to the DOS component to provide an application programming interface (API) called from the enterprise server; and
a core component to facilitate communication between the DOS component and the enterprise server, the core component comprising:
  a controller to capture the user event on the DOS component and transfer the user event to an application processor;
  the application processor including an event controller interface and an application model to receive the user event from the controller and process the user event by fetching data from the enterprise server based on user interface (UI) specific business logic;
  a service layer providing services to the application processor by converting fetched data into a data format before sending the data to the DOS component;
  an enterprise services infrastructure (ESI) interface coupled to the core component to integrate the DOS component with the SOA application of the enterprise server for processing the user event; and
  a pattern plug-in interface including a set of APIs to integrate the DOS component with an integrated development environment (IDE) to enable the usage of the DOS component without customizing the DOS component, wherein the IDE is configured to model the SOA application.

6. The system of claim 5, wherein the core component transfers the data between the DOS component and the enterprise server.

7. The system of claim 5, wherein the pattern plug-in interface provides the IDE access to the enterprise server via ESI.

8. An article of manufacture, comprising:
a non-transitory machine readable medium having instructions that when executed by the machine cause the machine to execute a method, comprising:
capturing, at a core component by a controller, a user event from a distributed object system (DOS) component using an active component framework (ACF) coupled to the DOS component to provide an application programming interface (API) called from an enterprise server;
transferring, by the controller, the user event to an application processor including an event controller interface and an application model to receive the user event from the controller;
processing, by the application processor, the user event by fetching data from the enterprise server in response to the captured user event based on user interface (UI) specific business logic via an enterprise services infrastructure (ESI) interface coupled to the core component to integrate the DOS component with an SOA application of the enterprise server for processing the user event;
converting, by the application processor, fetched data into a data format using services provided by a service layer of the core component;
sending the processed data to the DOS component; and
integrating the DOS component with an integrated development environment (IDE) by a pattern plug-in interface of the core component, including a set of APIs to enable usage of the DOS component without customizing the DOS component, wherein the IDE is configured to model a service oriented architecture (SOA) application.

9. The article of manufacture of claim 8, wherein the user event is received at the DOS component.

10. The article of manufacture of claim 8, wherein processing the user event further comprises: converting the fetched data into a data format.

11. The article of manufacture of claim 10, wherein the data format comprises extensible markup language (XML) format.

* * * * *